US009296883B2

United States Patent
Fagrell et al.

(10) Patent No.: US 9,296,883 B2
(45) Date of Patent: Mar. 29, 2016

(54) SEMICONDUCTIVE POLYMER COMPOSITION COMPRISING POLAR COPOLYMER

(75) Inventors: Ola Fagrell, Stenungsund (SE); Oscar Prieto, Gothenberg (SE); Christian Piel, Linz (AT); Bill Gustafsson, Stenungsund (SE)

(73) Assignee: BOREALIS AG, Vienna (AT)

( * ) Notice: Subject to any disclaimer, the term of this patent is extended or adjusted under 35 U.S.C. 154(b) by 421 days.

(21) Appl. No.: 13/580,882

(22) PCT Filed: Feb. 4, 2011

(86) PCT No.: PCT/EP2011/000535
§ 371 (c)(1),
(2), (4) Date: Oct. 25, 2012

(87) PCT Pub. No.: WO2011/107200
PCT Pub. Date: Sep. 9, 2011

(65) Prior Publication Data
US 2013/0032376 A1    Feb. 7, 2013

(30) Foreign Application Priority Data
Mar. 1, 2010 (EP) .................................. 10002075

(51) Int. Cl.
*H01B 1/04* (2006.01)
*C08L 23/08* (2006.01)
(Continued)

(52) U.S. Cl.
CPC ............ *C08L 23/0846* (2013.01); *C08F 210/02* (2013.01); *C08F 220/14* (2013.01); *C08K 3/04* (2013.01); *C08L 23/142* (2013.01)

(58) Field of Classification Search
None
See application file for complete search history.

(56) References Cited

U.S. PATENT DOCUMENTS 4,526,707 A * 7/1985 Kutsuwa .................. C08K 3/04
                                                  174/102 SC
4,778,866 A * 10/1988 Shimada et al. ............... 526/245
(Continued)

FOREIGN PATENT DOCUMENTS

EP      0 420 271      12/1994
EP      1 400 857       8/2004
(Continued)

OTHER PUBLICATIONS http://www.lotryl.com/export/sites/lotryl/.content/medias/downloads/literature/tds_lotryl_29ma03_2010.pdf, Jun. 2013.*
(Continued)

*Primary Examiner* — Satya Sastri
(74) *Attorney, Agent, or Firm* — Fay Sharpe LLP

(57) ABSTRACT

The present invention relates to a semiconductive polymer composition comprising: —an ethylene copolymer (A) comprising methyl(meth)acrylate co-monomer units, wherein the ethylene copolymer (A) has a melt temperature of 80° C. or below, and—carbon black, wherein the ethylene copolymer (A) is produced in a autoclave high pressure reactor or in a multi-feed tubular reactor; to a semiconductive polymer composition comprising—an ethylene copolymer (A) comprising methyl(meth)acrylate, comonomer units; and—carbon black, wherein ethylene copolymer (A) is characterized in that the fraction obtained in the first fractionation step (fraction 1) in the fractionation method of ethylene copolymer (A) as described herein, is present in an amount of not more than 40 wt. % based on the total amount of the ethylene copolymer (A); and to a cable comprising a semiconductive layer comprising the semiconductive polymer composition and to the use of the semiconductive polymer composition in the preparation of a semiconductive layer of a power cable.

11 Claims, 1 Drawing Sheet

(51) Int. Cl.
*C08F 220/14* (2006.01)
*C08F 210/02* (2006.01)
*C08K 3/04* (2006.01)
*C08L 23/14* (2006.01)

(56) References Cited

U.S. PATENT DOCUMENTS

| | | | | |
|---|---|---|---|---|
| 8,513,525 | B2* | 8/2013 | Torgersen | 174/110 R |
| 2004/0186234 | A1* | 9/2004 | Tsukamoto et al. | 525/191 |
| 2005/0075472 | A1* | 4/2005 | Yeager et al. | 528/86 |
| 2007/0012468 | A1* | 1/2007 | Han et al. | 174/34 |

FOREIGN PATENT DOCUMENTS

| | | |
|---|---|---|
| EP | 0 943 631 | 5/2006 |
| EP | 1 741 725 | 1/2007 |
| WO | WO 98/21278 | 5/1998 |
| WO | WO 9821278 A1 * | 5/1998 |
| WO | WO 00/25324 | 5/2000 |
| WO | WO 2005/031761 | 4/2005 |

OTHER PUBLICATIONS

Koenig, Jack L., *Spectroscopy of Polymers*, American Chemical Society, Washington D.C. 1992.

Albrecht, A., et al., *Analysing the Chemical Composition Distribution of Ethylene-Acrylate Copolymers: Comparison of HT-HPLC, CRYSTAF and TREF*, Macromol. Chem. Phys. 2008, 209, pp. 1909-1919.

International Search Report mailed Mar. 11, 2011 for International Application No. PCT/EP2011/000535.

Written Opinion mailed Mar. 11, 2011 for International Application No. PCT/EP2011/000535.

Reply to Written Opinion dated Nov. 25, 2011 for International Application No. PCT/EP2011/000535.

International Preliminary Report on Patentability for International Application No. PCT/EP2011/000535.

* cited by examiner

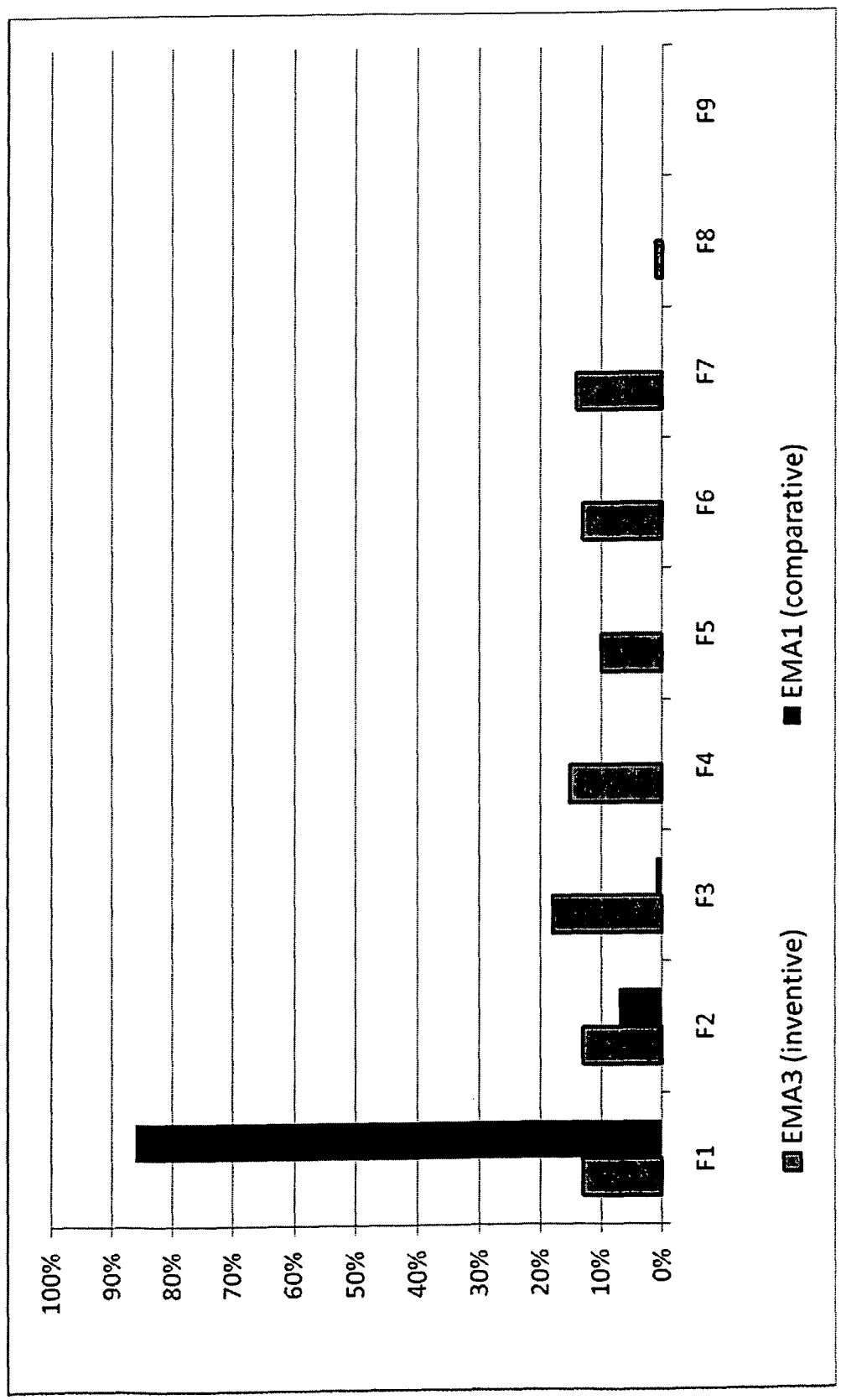

SEMICONDUCTIVE POLYMER COMPOSITION COMPRISING POLAR COPOLYMER

The present invention relates to a semiconductive polymer composition having easily controllable stripping characteristics, especially for an electric power cable. The present invention further relates to the use of such a semiconductive polymer composition and an electric power cable comprising at least one semiconductive layer comprising said semiconductive polymer composition.

Electric power cables for medium to high voltages normally include one or more metal conductors surrounded by an insulating material like a polymer material such as an ethylene homo- or copolymer.

In power cables, the electric conductor is usually coated first with an inner semiconducting layer, followed by an insulating layer, then an outer semiconducting layer, followed by optional layers such as water-barrier layers and on the outside optionally a sheath layer. The layers of the cable are commonly based on different types of ethylene polymers.

The insulating layer and the semiconducting layers normally consist of ethylene homo- and/or copolymers which are preferably cross-linked. LDPE (low density polyethylene, i.e. polyethylene prepared by radical polymerization at a high pressure) cross-linked with peroxide, e.g. dicumyl peroxide, in connection with the extrusion of the cable, has become the predominant cable insulating material. The inner semiconducting layer normally comprises an ethylene copolymer, such as an ethylene-vinyl acetate copolymer (EVA), ethylene methylacrylate copolymer (EMA), ethylene ethylacrylate copolymers (EEA), ethylene butylacrylate copolymer (EBA), cross-linking agent (e.g. peroxide) and sufficient amount and type of carbon black to make the composition semiconductive The composition of the outer semiconducting layer may differ from the composition of the inner semiconductive layer depending on whether the outer semiconducting layer has to be strippable or not. If the outer semicondutive shall not be strippable the composition used can be of same type as for the inner semiconductive layer.

Besides being semiconducting it is often desired that the outer semiconducting layer is strippable from the other layers (i.e. the insulating layer) to facilitate the joining of two cable ends. This strippability is achieved by making the outer semiconducting layer more polar (e.g. with the aid of a polar polymer, such as EVA) than the underlying insulating layer and cross-linking the outer semiconducting layer.

As an example of a strippable composition, mention may be made of EP-B1-0 420 271 which discloses a semiconducting insulation shielding composition for electric cables which, based on the total weight of the composition, consists essentially of (A) 40-64% by weight of an ethylene-vinyl acetate copolymer with 27-45% of vinyl acetate, (B) 5-30% by weight of an acrylonitrile-butadiene copolymer with 25-55% of acrylonitrile, (C) 25-45% by weight of carbon black having a surface area of 30-60 $m^2/g$, and (D) 0.2-5% by weight of an organic peroxide cross-linking agent. In addition, the composition may include 0.05-3% by weight of conventional additives.

One disadvantage of EVA conventionally used in semiconducting layers is that at elevated temperatures, such as during compounding of the semiconducting composition, EVA starts to decompose and generate acetic acid at about 150° C. At the same time double-bonds are formed in the polymer chain. The acetic acid, which is very corrosive, especially at high temperatures, attacks the processing equipment and leads to an undesired corrosion thereof. To a certain extent this may be counteracted by making the equipment of special, corrosion-resistant materials which, however, are expensive and add to the investment cost for manufacturing the cable. The release of acetic acid is also a negative factor from an environmental point of view. Further, the formation of double-bonds in the polymer chain at the generation of acetic acid may lead to undesired cross-linking and gel formation at this stage of the production.

Another disadvantage of EVA as a material for the semiconducting layers of electric cables manifests itself when cross-linking (vulcanising) cables. The cross-linking is usually conducted in a vulcanising tube, where cross-linking should take place as rapidly and completely as possible. For conventional cables having EVA-containing semiconductive layers, cross-linking is usually carried out at a maximum temperature of about 270 to 280° C. A nitrogen-gas pressure of about 8-10 bar is applied in the vulcanising tube and contributes to the preventing of oxidation processes by keeping away the oxygen of the air and to reducing the formation of microcavities, so-called voids, in the polymer layers. As explained above in connection with compounding of EVA, the elevated temperature at the cross-linking of EVA also causes generation of acetic acid and gel formation. The more elevated temperature at the cross-linking step compared to the compounding step results in a correspondingly increased generation of acetic acid and formation of gel. The acetic acid generated means a loss of VA from the EVA-containing layer and, probably connected therewith, a reduced strippability when making cables with a strippable outer semiconducting EVA-containing layer. Further, the acetic acid released condenses in the vulcanising tube together with other volatile substances and forms a viscous sticky liquid at the bottom of the vulcanising tube. This liquid must be removed from the vulcanising tube as otherwise it tends to adhere to and contaminate the surface of the cable. This implies production stops and lower productivity.

Although prior art compositions for semiconducting layers in electric cables are satisfactory for many applications, there is always a desire to improve their characteristics and eliminate or reduce any disadvantages they may have.

Furthermore, WO 2005/031761 discloses a cross-linkable insulation shield composition comprising at least one highly, short-chained branched polymer, at least one unsaturated ester interpolymer which is a polymer of ethylene and at least one unsaturated ester, the unsaturated ester being selected from the group consisting of vinyl esters, (meth)acrylic acid esters and mixtures thereof, and conductive carbon black. Such an ethylene polymer will provide the insulation shield made from the insulation shield composition with a strip force of greater than 1.1 kN/cm at 23° C. after being stored at 100° C. for two weeks when cured and an initial strip force of not greater than 8.4 kN/cm at 23° C. It is reported in this document that the described insulation shield compositions yielded improved processability during cable extrusion, reduced head pressure and melt temperature and showed comparatively low strippable force to insulation.

It is, however, further known that ethylene acrylic ester polymers while showing a better degradation profile, i.e. starting to degrade only at a temperature of 350° C. without forming an acid, it poses a severe difficulty to produce an EM(M)A polymer, wherein the methyl(meth)acrylate groups are evenly distributed over the molecular chain. The use of conventional EM(M)A in strippable semiconductive layers lead to strip forces which are much higher in comparison to the same strippable semiconductive layer containing EVA due to the blocky structure of the methyl(meth)acrylate groups arranged in the EM(M)A polymer. Details about structural differences in polar ethylene copolymers can be found it literature, e.g. A. Albrecht et al., Macromol. Chem. Phys. 2008, 209, 1909 or R. T. Chou et al., ANTEC proceedings 2004, 1851.

Furthermore, EBA of EEA are usually not employed in strippable semiconductive layers as the butyl and ethyl groups are larger and, consequently, the effect of the polar group towards the neighboring layer (usually the insulation layer) is reduced leading to a lower efficiency in comparison with M(M)A groups in EM(M)A.

It is the object of the present invention to provide a new semiconductive polymer composition suitable for a semiconductive layer of a power cable which is strippable, provides superior processability and which allows for an easy adjusting of its stripping characteristics according to specific needs.

Moreover, it is a further object of the present invention to provide a strippable semiconductive polymer composition which is easily processable and which allows increased working temperatures in its manufacture, higher compounding consistency and has improved handling properties.

The above objects are achieved by the present invention by providing in a first embodiment a semiconductive polymer composition comprising
  an ethylene copolymer (A) comprising methyl(meth)acrylate co-monomer units, wherein the ethylene copolymer (A) has a melt temperature of 80° C. or below; and
  carbon black,
wherein the ethylene copolymer (A) is produced in a autoclave high pressure reactor or in a multi-feed tubular reactor.

The above objects are also achieved in a second embodiment of the invention. The second embodiment provides a semiconductive polymer composition comprising
  an ethylene copolymer (A) comprising methyl(meth)acrylate co-monomer units; and
  carbon black,
wherein the ethylene copolymer (A) is characterized in that the fraction obtained in the first fractionation step (fraction 1) in the fractionation method of ethylene copolymer (A) as described herein, is present in an amount of not more than 40 wt. % based on the total amount of the ethylene copolymer (A).

The fractionation method of ethylene copolymer (A) as described herein separates fractions of ethylene copolymer (A) (component (A)) depending on their polarity and molecular weight whereby fraction 1 contains a more polar and lower molecular weight part of the semiconductive polymer composition than the subsequent fractions. Usually non-polar polymers, if present in the composition, such as polyolefins not comprising heteroatoms, are only comprised in a small amount in fraction 1 due to their low solubility at the applied conditions. A more blocky distribution of M(M)A comonomers results in a higher polarity of the polymer compared with a more statistical comonomer distribution. In case of such a more statistical distribution of the M(M)A comonomers the fractionation method of ethylene copolymer (A) will separate dominantly according to molecular weight.

Unless otherwise mentioned, the melt temperature of ethylene copolymer (A) is measured according to ISO 11357-3 the result being taken from the $2^{nd}$ heating cycle of the DSC measurement.

Said fraction 1, which is obtained in the first fractionation step, is the fraction of the ethylene copolymer (A) having the highest polarity and lowest molecular weight.

Carbon black is nearly insoluble at the conditions applied in the fractionation method of ethylene copolymer (A) as described herein.

In the first embodiment, preferably, the fraction obtained in the first fractionation step (fraction 1) in the fractionation method of ethylene copolymer (A) as described herein, is present in an amount of not more than 40 wt. % based on the total amount of the ethylene copolymer (A).

In the second embodiment, preferably, the ethylene copolymer (A) has a melt temperature of 80° C. or below.

Preferably, in the second embodiment the ethylene copolymer (A) is produced in an autoclave high pressure reactor or in a multi-feed tubular reactor.

Unless otherwise mentioned, in the following preferred features of all embodiments according to the present invention are described.

Furthermore, the present invention provides a power cable comprising a conductor, an insulating layer and at least one semiconductive layer wherein the at least one semiconductive layer comprises the semiconductive polymer composition as mentioned above.

In the art it is common knowledge that for a strippable semiconductive layer adjacent to an insulating layer usually a polar polymer composition comprising EVA is to be used, so as to facilitate the stripping.

It has now surprisingly been found that contrary to the expectations in the art, an ethylene copolymer comprising methyl(meth)acrylate comonomer units as defined in the present invention (in the following often abbreviated as "EM (M)A") is highly suitable in a semiconductive layer of a power cable to enable easy stripping of said semiconductive layer from an adjacent insulating layer. Furthermore, the strippability of the semiconductive polymer composition of the invention can easily be adjusted according to e.g. different industry standards.

The ethylene copolymer (A) of the present invention is a polar copolymer due to the incorporation of methyl(meth) acrylate units. The expression "methyl(meth)acrylate" encompasses methyl acrylate and/or methyl methacrylate units.

Preferably, the melt temperature of ethylene copolymer (A) is 75° C. or below, more preferably 70° C. or below. Usually the melt temperature is at least 55° C., preferably at elast 60° C.

The ethylene copolymer (A) may preferably have a crystallisation temperature (Tc) of 70° C. or below, measured by DSC measurement according to ISO 11357-3. Preferably, the crystallisation temperature is 65° C. or below, more preferably 60° C. or below, more preferably 55° C. or below, and even more preferably 50° C. or below.

Furthermore, the ethylene copolymer (A) may be present in the semiconductive polymer composition in an amount of 65 wt. % or less, more preferably of 60 wt. % or less, still more preferably of 55 wt. % or less, and most preferably of 50 wt. % or less, based on the total composition. Usually ethylene copolymer (A) is present in the semiconductive polymer composition in an amount of at least 20 wt. %, preferably at least 30 wt. %.

The ethylene copolymer (A) preferably has a content of methyl(meth)acrylate comonomer units of 5 wt. % or more, more preferably of 15 wt. % or more, even more preferably of 20 wt. % or more, and most preferably of 25 wt. % or more, based on the total weight of the ethylene copolymer (A). Further, preferably, the content of methyl(meth)acrylate comonomer units in ethylene copolymer (A) is not more than 50 wt. % more preferably not more than 45 wt. %, even more preferably not more than 40 wt. % and most preferably not more than 35 wt. % based on the total weight of the ethylene copolymer (A).

Preferred ranges may encompass e.g. 15 to 50 wt. %, 20 to 45 wt. %, 25 to 40 wt. %, or 25 to 35 wt. %, based on the total weight of the ethylene copolymer (A). Ranges such as 5 to 35 wt. %, or 20 to 35 wt. % may also be useful.

Preferably, the ethylene copolymer (A) has a melt flow rate $MFR_2$ (2.16 kg/190° C.) of 0.1 to 100 g/10 min, more preferably 1 to 60 g/10 min, even more preferably 5 to 50 g/10 min, and most preferably 15 to 50 g/10 min.

Preferably, fraction 1 of the ethylene copolymer (A) obtained by the fractionation method of ethylene copolymer (A) as described herein, is present in an amount of not more than 50 wt. % based on the total amount of ethylene copolymer (A), more preferably not more than 40 wt. %, even more preferably not more than 35 wt. % and most preferably of not more than 25 wt. % based on the total amount of ethylene copolymer (A). Preferably, fraction 1 of the ethylene copolymer (A) obtained by the fractionation method of ethylene copolymer (A) as described herein is present in an amount of at least 5 wt. % based on the total amount of ethylene copolymer (A).

Preferably, fractions 2 and 3 of the ethylene copolymer (A) obtained by the fractionation method of ethylene copolymer (A) as described herein, are each present in an amount of at least 3 wt. %, more preferably of at least 6 wt. % and most preferably of at least 9 wt. % based on the total amount of ethylene copolymer (A). Preferably, fractions 4 and 5 of the ethylene copolymer (A) obtained by the fractionation method of ethylene copolymer (A) as described herein, are each present in an amount of at least 2 wt. %, more preferably of at least 5 wt. % and most preferably of at least 8 wt. % based on the total amount of ethylene copolymer (A). Preferably, fractions 6 and 7 of the ethylene copolymer (A) obtained by the fractionation method of ethylene copolymer (A) as described herein, are each present in an amount of at least 2 wt. %, more preferably of at least 5 wt. % and most preferably of at least 8 wt. % based on the total amount of ethylene copolymer (A). In the fractionation method of ethylene copolymer (A) as described herein, the fractions are numbered in the order as obtained. Thus, fraction 1 is obtained in the first fractionation step, fraction 2 is obtained in the second fractionation step, etc.

As mentioned above, the semiconducting polymer composition according to the present invention differs from prior semiconducting EVA-containing compositions in that it does not generate any acetic acid at elevated temperatures. This is an important advantage, because it means that corrosion of the equipment when processing the composition will be greatly reduced or eliminated. Accordingly, it is not necessary to use expensive, highly corrosion-resistant materials for the equipment. Further, the absence of generation of obnoxious acetic acid means a substantial improvement of the working environment at plants producing the semiconducting polymer composition and electric cables containing the same.

Another important advantage of the present invention is the thermal stability of the ethylene-methyl(meth)acrylate copolymer and, consequently, of the composition containing the same. This thermal stability means that the composition can be heated to higher temperatures, e.g. during compounding. When the temperature of the composition is increased, its viscosity is reduced and the reduced viscosity means that the energy required to compound the composition is reduced too, i.e. a greater amount of composition can be compounded with the same amount of energy compared to conventional compositions. This fact may be used to advantage in two ways, namely either the same amount of composition may be compounded during the same period of time with a smaller amount of energy, or a greater amount of composition may be compounded during the same period of time with the same amount of energy, i.e. the productivity is increased. In both instances the present invention leads to a more economical and cost-saving processing of the composition.

As an illustration of the above EVA is compounded at a temperature of about 175-180° C., while EM(M)A may be compounded at an about 25° C. higher temperature thanks to their superior resistance to thermo-oxidative degradation. This means that the processing "window" is much wider for EM(M)A than for EVA and also that the productivity may be increased for EM(M)A compared to EVA.

As a further illustration, prior art EVA compositions are cross-linked at about 260-280° C., preferably about 270-280° C., and temperatures above about 280° C. are not used because of excessive acetic acid generation. In comparison, the EM(M)A-containing composition of the invention are more stable and does not generate any substances that can cause corrosion.

The invention is further characterized by using an autoclave high pressure reactor or a multi-feed tubular reactor in the preparation of the ethylene copolymer (A). It was surprisingly found that using such kind of process steps provides for superior randomness in methyl(meth)acrylate groups in the polymer chains, independent from the chain length. By the increased randomness and decrease of block units in the EM(M)A polymer, the strip forces when stripping the semiconductive layer from the insulation layer(s) could surprisingly be substantially decreased.

The increased superior randomness in methyl(meth)acrylate groups in the polymer chains can be seen from the comparatively lower melting point and the results of the fractionation method of ethylene copolymer (A) as described in the experimental part.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available, e.g. di-tert.-butyl peroxide. The polymerization reaction is exothermic and after startup (at elevated temperature, e.g. from 80 to 150° C. to create the first radicals) the exothermic heat generated sustains the reaction. Temperature in each zone is controlled by the cooled incoming feed mixture, cooling on the reactor vessel and the amount of radical initiator injected. Suitable temperatures range from 80 to 300° C. and pressures from 100 to 300 MPa. Pressure can be measured at least in the compression stage and after the autoclave reactor. Temperature is commonly measured for each zone of the autoclave reactor. Various temperature profiles, e.g. flat profile, i.e. constant temperature over all zones, or increasing temperature over the zones selected by a person skilled in the art will allow control of the structure of the polymer chain, i.e. long chain branching and short chain branching, density, branching factor, distribution of comonomers, MFR, viscosity, molecular weight distribution etc. The MFR of the ethylene copolymer (A), can be adjusted by using e.g. a chain transfer agent during the polymerization, or by adjusting reaction temperature or pressure.

The reactor is conventionally terminated by a valve. The valve regulates reactor pressure and depressurizes the reaction mixture from reaction pressure to separation pressure.

To the contrary a conventional high-pressure tubular polymerization reactor usually has a length—diameter ratio of >10000 and no back-mixing occurs due to the plug flow through the tubular reactor. The heat generated by the polymerisation reaction is removed through the tube walls by means of a cooling medium, e.g. water or steam. A compressed mixture of ethylene, modifiers and optional comonomers is commonly heated to 140 to 180° C. in a preheating section and thereafter radical initiators are injected into the tubular reactor to start the polymerization. The reaction reaches a maximum temperature whereupon no further polymerization takes place and the mixture is cooled. Suitable temperature ranges from 150 to 330° C. and pressure from 200 to 350 MPa. The pressure is usually measured at least in the compression stage and after the tubular reactor. The temperature is commonly measured at multiple points in the tubular reactor.

A multi-feed tubular reactor differs from such a conventional tubular reactor in that the M(M)A feed is split up and fed, together with ethylene and optionally other components, to at least 3 reaction zones along the tubular reactor.

The reaction zones may have individual length-diameter ratios to encompass the stepwise increase in volume flow over the reactor. This type of reactor allows for less variations in M(M)A content along the reactor and, thus, provides a more even distribution of the M(M)A comonomer in the polymer.

The semiconductive polymer composition according to the present invention may optionally comprise a polymer (B) which is an alpha-olefin homo- or copolymer comprising alpha-olefin monomer units (Q) selected from one $C_2$ to $C_{10}$ alpha-olefin; and optionally, monomer units (R) selected from one or more alpha-olefin(s) different from (Q).

Preferably, polymer (B) is a copolymer.

However, in case of polymer (B) being a homopolymer, polymer (B) consists of alpha-olefin monomer units (Q) whereby polyethylene, polypropylene or polybutylene are preferred.

Preferably, alpha-olefin monomer units (Q) are selected from one of $C_3$ to $C_{10}$ alpha-olefins, more preferably are selected from one of $C_3$ to $C_6$ alpha-olefins, even more preferably are selected from one of $C_3$ or $C_4$ alpha-olefins and most preferably are propylene monomers.

Alpha-olefin monomer units (R) are preferably selected from one or more of $C_2$ to $C_{10}$ alpha-olefin monomer units, more preferably selected from one or more of $C_2$ to $C_6$ alpha-olefin monomer units, even more preferably selected from $C_2$ and/or $C_4$ alpha-olefin monomer units and most preferably alpha-olefin monomer units (R) are 1-butene monomer units.

Thus, the polymer (B) may also contain three or more different monomeric alpha-olefin units. Usually polymer (B) does not contain more than five different monomeric units. For example, polymer (B) may be a terpolymer such as poly (ethylene-propylene-butylene) to mention just one example.

For clarification it shall be noted that in case one of monomer units (R) being ethylene, monomer units (Q) cannot be ethylene due to the above definition that (Q) and (R) are different.

Preferably, the total amount of comonomers (R) based on the total weight of polymer (B) is 50 wt. % or less, still more preferably 30 wt. %. It is further preferred that total amount of comonomers (R) based on the total weight of polymer (B) is 3 wt. % or more.

Alpha-olefin monomer units (Q) may preferably be contained in polymer (B) in an amount of 50 wt. % or more, more preferably in an amount of from 70 to 90 wt. %, based on the total weight of polymer (B).

In a preferred embodiment (Q) are propylene monomer units.

In this embodiment preferably one or more comonomers (R) are present in polymer (B).

In this embodiment preferably one of comonomers (R) is selected from ethylene or 1-butene, preferably 1-butene.

Preferably, in this embodiment polymer (B) comprises not more than two comonomers (R), more preferably one comonomer (R).

However, in case polymer (B) comprises two comonomers (R), preferably these two comonomers are ethylene and 1-butene.

Hence, preferably polymer (B) is a propylene random copolymer or a heterophasic propylene copolymer. A heterophasic propylene copolymer comprises a propylene matrix phase which is a propylene homopolymer or random copolymer and a dispersed rubber phase, such as a propylene-alpha-olefin rubber whereof one example is a propylene-butene rubber. The propylene copolymer of this embodiment may also comprise an olefin-based terpolymer such as a propylene-ethylene-alpha-olefin terpolymer. One example is a propylene-ethylene-butene terpolymer which may have elastomeric properties.

The melting point of polymer (B) preferably is 110° C. or less, more preferably is 100° C. or less, more preferably 90° C. or less, even more preferably 85° C. or less and most preferably 80° C. or less. The melting point of polymer (B) should preferably not be lower than 50° C.

Preferably, the semiconductive polymer composition comprises polymer (B) in an amount of 1 wt. % or more, more preferably of 3 wt. % or more, even more preferably of 5 wt. % or more, and most preferably of 10 wt. % or more.

Furthermore, the semiconductive polymer composition preferably comprises polymer (B) in an amount of 45 wt. % or less, more preferably of 35 wt. % or less, and most preferably of 25 wt. % or less. According to preferred embodiments of the invention the polymer (B) may be contained in an amount of from 10 to 45 wt. %, or from 5 to 15 wt. % of the total weight of the semiconductive polymer composition.

The melt flow rate $MFR_2$, measured at 230° C., of the olefin polymer (B) preferably is from 0.5 to 50 g/10 min, more preferably is from 3 to 35 g/10 min.

The alpha-olefin homo- or copolymer (B) may preferably have a density of 910 kg/m³ or lower, more preferably 900 kg/m³ or lower determined according to ASTM D792.

A suitable catalyst for the polymerization of the alpha-olefin homo- or copolymer (B) is any stereospecific single-site catalyst for olefin polymerization which is capable of polymerizing the olefin polymer at a temperature of 40 to 110° C. and at a pressure from 10 to 100 bar. Suitable single-site catalysts are metallocene single-site catalysts as described for example in EP 1741725 A1 and EP 0943631 A1. However, Ziegler Natta catalysts may also be used.

With the use of a metallocene single-site polymerization catalyst it is possible to improve the property profile of the strippable semiconductive polymer composition of the invention. Therefore a metallocene single-site polymerisation catalyst is preferred. In particular, the temperature cable manufacture processing window is higher when using a metallocene catalyst. Thus, the processing temperature may be sufficiently low to avoid scorch generation due to peroxide decomposition and sufficiently high to provide for superior melt homogenisation so as to guarantee an elastic formable melt which gives an excellent surface smoothness to the semiconductive polymer composition.

A metallocene single-site catalyst further lowers the Vicat softening point of the obtained alpha-olefin homo- or copolymer (B), ensures an even comonomer distribution and a narrow molecular weight distribution (Mw/Mn) which parameters contribute to the above-described enhanced property profile.

Still further, the semiconductive polymer composition of the present invention may comprise an elastomeric component (C). The elastomeric component (C) may comprise or consist of a nitrile-diene rubber, typically but not necessarily acrylonitrile-butadiene rubber (NBR). As the diene isoprene may also be used.

The elastomeric component (C) may preferably be contained in the semiconductive polymer composition of the present invention in an amount of not more than 20 wt. %, more preferably not more than 15 wt. %, even more preferably not more than 10 wt. %, based on the total weight of the semiconductive polymer composition. In case component (C) is present it is usually present in an amount of at least 3 wt. % based on the total weight of the semiconductive polymer composition.

If the elastomeric component (C) is contained in the inventive semiconductive polymer composition, it is preferable to also incorporate a compabilitiser, a lubricant like a wax, stearate or silicone etc. and/or a parting agent (anti-caking agent) to improve the homogeneity and the free flowing properties of the composition.

The semiconductive polymer composition further preferably comprises carbon black.

The amount of carbon black is at least such that a semiconducting polymer composition is obtained. Depending on type of the used carbon black and the desired use and conductivity of the composition, the amount of carbon black can vary.

Preferably, the semiconductive polymer composition comprises 10 to 50 wt % carbon black, based on the weight of the total semiconductive polymer composition. More preferably, the amount of carbon black is 10 to 45 wt. %, still more preferably 15 to 45 wt. % or 20 to 45 wt. %, still more preferably 30 to 45 wt. %, still more preferably 30 to 40 wt. %.

Any carbon black can be used which is electrically conductive. Examples of suitable carbon blacks include furnace blacks and acetylene blacks. As carbon black, furnace carbon black is especially preferred.

Suitable furnace blacks may have a primary particle size of greater than 28 nm, measured according to ASTM D-3849. Many suitable furnace blacks of this category are characterized by an iodine number between 30 and 200 mg/g according to ASTM D-1510 and an oil absorption number between 80 and 300 ml/100 g according to ASTM D-2414.

Other suitable carbon blacks can be made by any other process or be further treated.

Suitable carbon blacks for semiconductive cable layers are preferably characterized by their cleanliness. Therefore, preferred carbon blacks have an ash-content of less than 0.2 wt. % measured according to ASTM-1506, a 325 mesh sieve residue of less than 30 ppm according to ASTM D-1514 and have less than 1 wt. % total sulphur according to ASTM-1619.

Most preferred are extra-clean furnace carbon blacks having an ash-content of less than 0.05 wt. % measured according to ASTM-1506, a 325 mesh sieve residue of less than 15 ppm according to ASTM D-1514 and have less than 0.05 wt. % total sulphur according to ASTM-1619.

According to a preferred embodiment, the semiconductive polymer composition further comprises a cross-linking agent.

In the context of the present invention, a cross-linking agent is defined to be any compound which can initiate radical cross-linking. A cross-linking agent can be a compound capable of generating radicals when decomposed but also comprises the radicals obtained after decomposition. Preferably, the cross-linking agent contains at least one —O—O— bond or at least one —N=N— bond. More preferably, the cross-linking agent is a peroxide and/or a radical obtained therefrom after thermal decomposition.

The cross-linking agent, e.g. a peroxide, is preferably added in an amount of less than 3.0 wt. %, more preferably 0.2 to 2.6 wt. %, even more preferably 0.3 to 2.2 wt. %, based on the weight of the semiconductive polymer composition. To have a good balance between scorch and cross-linking efficiency, it might be preferred to add the cross-linking agent, in particular a peroxide, in an amount of 0.4 to 1.5 wt. %, even more preferably 0.8 to 1.2 wt. %, based on the weight of the semiconductive polymer composition.

The cross-linking agent may be added to the semiconductive polymer composition during the compounding step or after the compounding step in a separate process, or during the semiconductive cross-linkable polymer composition is extruded, or after the extrusion, e.g. by diffusion of cross-linking radicals from another cable layer into the semiconductive layer.

As peroxides used for cross-linking, the following compounds can be mentioned: di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, di(tert-butylperoxy-isopropyl)benzene, butyl-4,4-bis(tert-butylperoxy)valerate, 1,1-bis(tert-butylperoxy)-3,3,5-trimethylcyclohexane, tert-butylperoxybenzoate, dibenzoylperoxide.

Preferably, the peroxide is selected from 2,5-di(tert-butylperoxy)-2,5-dimethylhexane, 2,5-di(tert-butylperoxy)-2,5-dimethyl-3-hexyne, di(tert-butylperoxy-isopropyl)benzene, dicumylperoxide, tert-butylcumylperoxide, di(tert-butyl)peroxide, or mixtures thereof. Most preferably, the peroxide is tert-butylcumylperoxide and 2,5-di(tert-butylperoxy)-2,5-dimethyl-3-hexyne.

The semiconductive polymer composition may comprise further additives. As possible further additives, antioxidants, scorch retarders, cross-linking boosters, stabilisers, processing aids, lubricants, compatibilizers, parting agents, anti-caking agents, flame retardant additives, acid scavengers, inorganic fillers, voltage stabilizers, additives for improving water tree resistance, or mixtures thereof can be mentioned.

It is also possible to include a small amount, preferable 15% or less, of another filler in addition to the carbon black to improve properties like tear behaviour etc. Examples of such additional fillers are calcium carbonate, talc, silica, magnesium hydroxide, aluminium hydroxide, mica, wollastonite, barium sulfate, calcite, and hydrotalcite.

In the production of a power cable comprising a conductor, an insulating layer and at least one semiconductive layer, the inventive semiconductive polymer composition may be contained in at least one of said semiconductive layers.

The power cable comprising the semiconductive copolymer composition of the present invention may further comprise additional layers such as water barrier layers and a sheath layer.

As mentioned above, a cross-linking agent, preferably a peroxide, can be added to the semiconductive polymer composition. The point in time for adding the cross-linking agent can be varied. As an example, the cross-linking agent may be added to the semiconductive cross-linkable polymer composition when the polyolefin is mixed with the carbon black in a compounding step, or after the compounding step in a separate process step. Furthermore, the cross-linking agent may be added during extrusion of the semiconductive cross-linkable polymer composition.

Usually, the semiconductive polymer composition is extruded at a temperature of at most 140° C., more preferably at a temperature of at most 135° C. Said temperature range is preferably also employed when the semiconductive polymer composition is extruded into the layer of a cable.

Furthermore, the temperature during compounding of the semiconductive polymer composition does not exceed 210° C.

The present invention also pertains to an electric power cable comprising a semiconducting layer formed by the semiconductive polymer composition as described above.

Usually, semiconducting layers are contained in medium to high voltage cables, in which a conductor core, e.g. copper or aluminum, is surrounded by at least one inner semiconducting layer, an insulation layer, and at least one outer semiconducting layer. Optionally, further shielding layers and/or a cable jacket may be present.

Preferably, at least one semiconductive layer of a power cable, more preferably the outer semiconductive layer adjacent to the insulating layer is formed by the composition as described above.

Furthermore, preferably the insulation layer comprises an ethylene homo- or copolymer, which is preferably cross-linked.

Insulations can consist of extruded polymers included polyethylene such as LDPE and HDPE, cross-linked polyethylene (XLPE), which may be water-tree resistant (WTR-XLPE) and ethylene propylene rubber (EPR). The extruded polymers may either be thermoplastic or cross-linked. Thermoplastic material will deform upon subsequent heating, whereas cross-linked material will tend to maintain their form at higher operating temperatures.

Finally, the present invention relates to the use of a semiconducting polymer composition as described above for the production of a semiconductive layer of an electric power cable, preferably a medium to high voltage electric power cable.

EXAMPLES

The present invention will now be described in more detail by reference to the following examples and comparative examples. Parts and % are weight based, if not specified otherwise.

1. Test Methods

Unless otherwise stated in the description or claims, the following methods were used to measure the properties defined generally above and in the claims and in the examples below. The samples were prepared according to given standards, unless otherwise stated.

(a) Melt Flow Rate

The melt flow rate was determined according to ISO 1133 for propylene copolymers at 230° C., at a 2.16 kg load ($MFR_2$) and for ethylene copolymers at 190° C., at a 2.16 kg load ($MFR_2$).

(b) Density

Density of the polymer was measured according to ISO 1183-2/1872-2B and is given in kg/m³.

(c) Melt temperature and crystallization temperature of the ethylene copolymer (A) and polymer (B)

DSC was performed according to ISO11357-3. DSC curves were measured on a Mettler TA820 apparatus, with temperatures calibrated with n-hexane and indium and enthalpy calibrated with indium and zinc; indium (Tm=156.6° C., dH=28.45 J·g⁻¹), n-hexane (Tm=−95.6° C.), zinc (dH=107.5 J·g⁻¹).

3 mg±0.5 mg of the sample was placed into an aluminum pan for measurements. A heating, cooling and second heating scan was applied to the sample at heating and cooling rates of 10 K/min in the temperature range between −80° C. and +120° C. The results of the second heating cycle were used for determining the melt temperature (Tm). Melting and crystallization temperatures (Tc) were taken as the main peaks of the resulting curves.

(d) Preparative Fractionation Method of Ethylene Copolymer (A)

The measurements were performed by preparative fractionation (PREP) on a semiautomated fractionation instrument, PREP-mc2 from Polymer-Char, Spain. 1 g of a sample was dissolved in a total solvent volume of 180 ml. Xylene and 2-propanol (isopropanol), both containing 600 mg/L Irganox® 1010 as stabilizer, were used as solvents. The sample was dissolved in the instrument's vessel in xylene (4% of total solvent volume) under discontinuous gentle stirring. Stirring was performed discontinuously at 200 rpm, with turning the stirrer on for 10 s, and turning off for 5 s, The temperature profile was as follows: heating to a temperature of 120° C. (30 K/min heating rate) for 60 min, cooling down to 75° C. (30 K/min cooling rate) keeping the solution at 75° C. for 20 min before cooling further down to 70° C. (0.5 K/min cooling rate). 2-propanol was added (96% of total solvent volume) to the solution which was discontinuously stirred for 60 min at 70° C. The solution was allowed to cool to 25° C. and taken out by pressing it through a filter placed inside the vessel using nitrogen overpressure. This solution contained fraction 1. The following steps were further applied and repeated for each fractionation step to give the fractions 2 to 9. The solvent mixture ratios are given below, the total solvent volume in each step was 180 mL.

The vessel was heated up to 75° C. (20 K/min cooling rate). Xylene was added and it was discontinuously stirred for 25 min. Then cooling was performed to 70° C. (0.5 K/min cooling rate). 2-Propanol was added and it was discontinuously stirred for 30 min. Heating was performed to 75° C. (20 K/min cooling rate), and the temperature was kept at 75° C. for 5 min. Then cooling was performed to 70° C. (0.5 K/min cooling rate), and the temperature was kept at 70° C. for 30 min. Thereafter the solution was filtered using nitrogen overpressure.

Solvent amounts (volume %) of 2-propanol for fractionation:
Fraction 1 96%
Fraction 2 85%
Fraction 3 79.5%
Fraction 4 77%
Fraction 5 75.5%
Fraction 6 73%
Fraction 7 60%
Fraction 8 0%
Fraction 9 0%

After adding 200 ml of acetone to each of the obtained fraction solutions (fraction 1 to 9), they were allowed to precipitate over night at 7° C. and filtered thereafter through 5 micrometer PTFE filters by vacuum filtration. After drying under vacuum at 55° C., the fractions were weighed on a precision scale.

Fractionation of polymer compositions is always leading to minor material losses which is usually reflected by the sum of all retained fractions is giving a lower amount of material then the original sample weight. As long as at least 94 weight-% of the original weight is recovered, this may be neglected. In case of higher loss the fractionation needs to be repeated.

(e) Strip Force

Cable samples of 10 cm up to 13.5 cm of length and 10 mm width were cut in cross sectional direction from a test cable which had an inner semiconductive layer with a thickness of 0.8±0.05 mm, an insulation layer with a thickness of 5.5±0.1 mm, and an outer semiconductive layer with a thickness of 1±0.1 mm. The test cables were prepared according to the method "Test cable and preparation method thereof" described below using the given inner semiconductive layer material and insulation layer material for the test sample and using the polyolefin composition to be tested as said outer semiconductive layer material. The strip force test can be made for test cable wherein said sample is in non-cross-linked or cross-linked form. The samples were conditioned for 16 hours to 2 weeks at 23° C. and 50% relative humidity. The separation of the outer semiconductive layer from the insulation was initiated manually. The cable was fixed to Alwetron TCT 25 tensile testing instrument (commercially available from Alwetron). The manually separated part was clamped onto a wheel assembly which is fixed to a moveable jaw of said instrument. The movement of the tensile testing machine causes the separation of said semiconductive layer from said insulation layer to occur. The peeling was carried out using a peeling angle of 90° and peeling speed of 500 mm/min. The force required to peel said outer semiconductive layer from the insulation was recorded and the test was repeated at least six times for each test layer sample. The average force divided by the width (10 mm) of the sample was taken as said strip force and the given values (kN/m at (90°) represent the average strip force of the test samples, obtained from at least six samples.

(f) Oil Adsorption Number, (Dibutyl Phthalate)

DBP adsorption number of the carbon black samples was measured in accordance with ASTM D2414-06a.

(g) Iodine Number

The iodine number of the carbon black samples was measured in accordance with ASTM D1510-07.

(h) Determination of Comonomer Content

Determination of Polar Comonomer Content (FTIR)

Comonomer Content of Polar Comonomers (1) Polymers containing >6 wt. % polar comonomer units Comonomer content (wt %) was determined in a known manner based on Fourier transform infrared spectroscopy (FTIR) determination calibrated with quantitative nuclear magnetic resonance (NMR) spectroscopy. For the FTIR measurement a film of 0.5-0.7 mm thickness was prepared. After the analysis with FTIR, base lines in absorbance mode were drawn for the peaks to be analysed. The absorbance peak for the comonomer was normalised with the absorbance peak of polyethylene (e.g. the peak height for butyl acrylate or ethyl acrylate at 3450 cm$^{-1}$ was divided with the peak height of polyethylene at 2020 cm$^{-1}$). The NMR spectroscopy calibration procedure was undertaken in the conventional manner as described in Spectroscopy of Polymers, J. L. Koenig American Chemical Society, Washington D.C., 1992. For the determination of the content of methyl acrylate a 0.10 mm thick film sample was prepared. After the analysis the maximum absorbance for the peak for the methylacrylate at 3455 cm$^{-1}$ was subtracted with the absorbance value for the base line at 2475 cm$^{-1}$ ($A_{methylacrylate}-A_{2475}$). Then the maximum absorbance peak for the polyethylene peak at 2660 cm$^{-1}$ was subtracted with the absorbance value for the base line at 2475 cm$^{-1}$ ($A_{2660}-A_{2475}$). The ratio between ($A_{methylacrylate}-A_{2475}$) and ($A_{2660}-A_{2475}$) was then calculated in the conventional manner, as described in Spectroscopy of Polymers, J.L. Koenig American Chemical Society, Washington D.C., 1992.

(2) Polymers Containing 6 wt. % or Less Polar Comonomer Units

Comonomer content (wt. %) was determined in a known manner based on Fourier transform infrared spectroscopy (FTIR) determination calibrated with quantitative nuclear magnetic resonance (NMR) spectroscopy. For the FT-IR measurement a film of 0.05 to 0.12 mm thickness was prepared. After the analysis with FT-IR base lines in absorbance mode were drawn for the peaks to be analysed. The maximum absorbance for the peak for the comonomer (e.g. for methylacrylate at 1164 cm$^{-1}$ and butylacrylate at 1165 cm$^{-1}$) was subtracted with the absorbance value for the base line at 1850 cm$^{-1}$ ($A_{polar\ comonomer}-A_{1850}$). Then the maximum absorbance peak for polyethylene peak at 2660 cm$^{-1}$ was subtracted with the absorbance value for the base line at 1850 cm$^{-1}$ ($A_{2660}-A_{1850}$). The ratio between ($A_{comonomer}-A_{1850}$) and ($A_{2660}-A_{1850}$) was then calculated. The NMR spectroscopy calibration procedure was undertaken in the conventional, as described in Spectroscopy of Polymers, J.L. Koenig American Chemical Society, Washington D.C., 1992.

Quantification of Comonomer Content by NMR Spectroscopy (Polymer (B))

The comonomer content of polymer (B) was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

2. Materials

The ingredients given in the following Table 1 were used for the preparation of the polymer compositions. All amounts are given in parts by weight.

(a) Composition of the Outer Semiconductive Layer

The components of the outer semiconductive layer composition were those of the polyolefin composition under test. The test polyolefin compositions used in the present experimental part were polyolefin compositions of inventive examples 1 to 3 and the polymer compositions of comparative examples 1 and 2 as listed in the tables below.

The preparation of the outer semiconductive layer composition was effected by compounding the components in a Buss mixer. Accordingly, the compounding operations were made in a 46 mm continuous Buss mixer. The ethylene copolymer (A), and polymer (B), and additives, if any, were charged to the first hopper of the mixer. A filler-like carbon black was charged into the subsequent second hopper and the mixing was continued at 170-190° C. followed by pelletising. When used, the peroxide component was charged to the pellets in a separate processing step.

(b) Production of Test Cables

The test cables were prepared using a so-called "1 plus 2 extruder set-up", in a Maillefer extruder, supplied by Maillefer. Thus, the inner semiconductive layer was extruded on the conductor first in a separate extruder head, and then the insulation and outer semiconductive layer are jointly extruded together on the inner semiconductive in a double extruder head. The inner and outer semiconductive extruder screw had a diameter of 45 mm/24D and the insulation screw had a diameter of 60 mm/24D.

Each test cable was cross-linked in nitrogen in a CV-vulcanization tube

Each test cable had the following properties:

| | Test cable construction |
|---|---|
| Conductor diameter | 50 mm² Al |
| Inner semiconductive layer, thickness | 0.8 ± 0.05 mm |
| Insulation layer, thickness | 5.5 ± 0.1 mm |
| Outer semiconductive layer, thickness | 1 ± 0.1 mm |

Details of the used polymers are given in table 1 on the next page.

Cables were produced at speed of 1.6 m/min. 2 zones (zone 1 and zone 2) of 3 meter each were used in vulcanization tube with the following temperatures: Zone 1 400° C. and Zone 2 375° C. Then cables were cooled down by using water. Finally cables were stored for 24 to 48 hours before analysis.

TABLE 2

Results from melt and crystallisation temperatures measured by DSC according to ISO 11357-3 (see above)

| | Crystallisation temperature (° C.) | Melt temperature (° C.) |
|---|---|---|
| Elvaloy ® 1330 EAC (tube) (EMA 1—comparative) | 66 | 84 |
| Lotryl ® 28 MA 07 (Autoclave) (EMA 3—inventive) | 48 | 62 |

It can be clearly seen from the results of the above Table 2 that the ethylene copolymer according to the present invention shows significantly reduced crystallisation temperature and melt temperature which are due to a more evenly distributed MA groups in the polymer chains of the present invention.

The following Table 3 lists the ethylene methylacrylate copolymer according to the invention (Lotryl® 28MA 07-EMA 3) and the comparative ethylene methylacrylate copolymer (Elvaloy® 1330 EAC-EMA 1) together with determined fractionation results (fraction yields). F1 to F9 signify the fractions 1 to 9 obtained by the fractionation

TABLE 1

| Trade name | Polymer | | Comonomer content wt. % FTIR determination method on page 25 | MFR 2.16 kg 190° C. ISO 1133 [g/10 min] | Density ISO 1183-2 [kg/m³] | Melting point ISO 11357 ° C. |
|---|---|---|---|---|---|---|
| Elvaloy ® 1330 EAC | EMA 1/tube process | EMA 1 | MA = 30 | 3 | 950 | 84 |
| Lotryl ® 29 MA 03 | EMA 2/autoclave process | EMA 2 | MA = 27-31 | 3 | 950 | 61 |
| Lotryl ® 28 MA 07 | EMA 3/autoclave process | EMA 3 | MA = 26-30 | 7 | 950 | 62 |
| Tafmer ® XM 5070MP | Copolymer 1 | PP-PB copolymer | | 7 (230° C.) | | |

Carbon black

| Trade name | Type | Oil adsorp no. (ml/100 g) ASTMD2414 | Iodine nr. (mg/g) ASTM D1510 |
|---|---|---|---|
| Conductex ® 7051 | CB Furnace black | 115-127 | 38-48 |

Additives

| | | Type (CAS Number) |
|---|---|---|
| (TMQ) | Stabiliser | TMQ (26780-96-1) |
| | Peroxide 1 | 2,5-DIMETHYL-2,5-DI-(TERT-BUTYL-PEROXY)HEXYNE-3 (1068-27-5) |

| | | | MFR 2.16 kg 190° C. | Density |
|---|---|---|---|---|
| LE4201 | Insulation | LDPE peroxide | 2 | 923 |
| LE0592 | Inner semiconductive | EBA | 20 g/10 min (MFR$_{21}$) | 1150 |

Elvaloy ® is a registered trademark of E.I. DuPont de Nemours and Company
Lotryl ® is a registered trademark of Arkema Inc.
Tafmer ® is a registered trademark of Mitsui Co., Ltd.
Conductex ® is a registered trademark of Columbian Chemicals Company
LE4201 and LE0592 are commercial available insulation and semiconductive products produced by Borealis The following Table 2 lists an ethylene methylacrylate copolymer according to the invention (EMA3) and a comparative ethylene methylacrylate copolymer (EMA1) together with determined melt temperatures and crystallisation temperatures.

method of ethylene copolymer (A) conducted as described in detail above. Fraction 1 constitutes the part of the polymer which has the most blocky structure (the most polar sequences) and determines the least degree of randomness. The lower randomness of the comonomer distribution (more blocky structure) leads to a higher crystallinity as, in a blocky structure, the methyl acrylate deficient part of the polyethylene chain easily crystallizes. The higher crystallinity in turn leads to a higher melting point and crystallization temperature.

TABLE 3

| Fraction | Fraction yield | |
|---|---|---|
| | Lotryl 28MA07 (EMA 3) | Elvaloy 1330 (EMA 1) |
| Fraction 1 | 13% | 86% |
| Fraction 2 | 13% | 7% |
| Fraction 3 | 18% | 1% |
| Fraction 4 | 15% | 0% |
| Fraction 5 | 10% | 0% |
| Fraction 6 | 13% | 0% |
| Fraction 7 | 14% | 0% |
| Fraction 8 | 1% | 0% |
| Fraction 9 | 0% | 0% |
| recovery | 97% | 94% |
| Σ (Fraction 2 to Fraction 9) | 84% | 8% |

The results in Table 3 show that the EMA falling under the invention shows a high degree in randomness (Σ(Fraction 2 to Fraction 9): 84%) due to the preparation by the autoclave process, whereas the comparative EMA sample exhibits a substantially blocky nature (fraction 1: 86%) due to the preparation in a conventional tubular process.

The following Table 4 lists compositions according to the invention and comparative compositions together with strip forces measured on non cross-linked compositions.

TABLE 4

| Strip Forces on non-cross-linked cables Strip Forces | | | |
|---|---|---|---|
| | CE 1 | Ex. 1 | Ex. 2 |
| EMA 1 [wt. %] | 47.3 | | |
| EMA 2 [wt. %] | | 47.3 | |
| EMA 3 [wt. %] | | | 47.3 |
| Conductex ® 7051 [wt. %] | 37 | 37 | 37 |
| TMQ [wt. %] | 0.7 | 0.7 | 0.7 |
| Tafmer ® XM5070 [wt. %] | 15 | 15 | 15 |
| Strip Force 90°(kN/m) | 5 | 2.4 | 2.9 |
| Standard deviation | 0.9 | 0.46 | 0.4 |
| No. of tests | 9 | 6 | 6 |
| Pick off | no | no | no |

CE: comparative example; Ex.: Example according to the invention

It is evident from the above Table 4 that more evenly distributed MA groups in the polymer chains significantly reduce the strip force of an outer semiconductive polymer composition (Ex. 1 and 2) compared with a more blocky distributed EMA composition (CE 1).

If considering the melt temperatures of the polymers (Table 2) it can be seen EMA 3 has a relatively low Tm compared to EMA 1. This is a proof of the randomness of the copolymer. This low Tm translates into low strip force values as can be seen in Table 4 above.

The following Table 5 lists a composition according to the invention and comparative compositions together with strip forces measured on cross-linked compositions.

TABLE 5

| Strip Forces on cross-linked cables | | |
|---|---|---|
| | CE 2 | Ex. 3 |
| EMA 1 [wt. %] | 46.8 | |
| EMA 2 [wt. %] | | 46.8 |
| Conductex ® 7051 [wt. %] | 37 | 37 |
| TMQ [wt. %] | 0.7 | 0.7 |
| Tafmer ® XM5070 [wt. %] | 15 | 15 |
| 2,5-DIMETHYL-2,5-DI-(TERT-BUTYL-PEROXY)HEXYNE-3[wt. %] | 0.5 | 0.5 |
| Strip Force 90° (kN/m) | Bonded | 7 |
| Standard deviation | | 0.46 |
| No. of tests | 9 | 6 |
| Pick off | | no |

CE: comparative example; Ex.: Example according to the invention

It is evident from Table 5 that cross-linked EMA 2 (inventive) achieves a comparatively low strip force in an outer semiconductive layer whereas cross-linked EMA 1 (comparative) provided a non-strippable (bonded) outer semiconductive layer.

The invention claimed is:

1. A semiconductive polymer composition comprising:
   an ethylene copolymer (A) comprising methyl(meth)acrylate co-monomer units, wherein the ethylene copolymer (A) has a melt temperature of 80° C. or below, and
   carbon black,
   wherein the ethylene copolymer (A) is produced in a autoclave high pressure reactor or in a multi-feed tubular reactor, and
   a polymer (B) which is an alpha-olefin copolymer comprising:
   alpha-olefin monomer units (Q) selected from one of $C_3$ to $C_{10}$ alpha-olefins; and
   monomer units (R) selected from one or more alpha-olefin(s) different from (Q), wherein one of the monomer units (R) is 1-butene.

2. A semiconductive polymer composition comprising:
   an ethylene copolymer (A) comprising methyl(meth)acrylate co-monomer units; and
   carbon black,
   wherein ethylene copolymer (A) is characterized in that when a first fraction of a sample of the ethylene copolymer is obtained using a solvent of 4% xylene/96% 2-propanol (v/v) according to a Preparative Fractionation Method of Ethylene Copolymer (A), the first fraction contains an amount of not more than 40 wt. % of the sample of the ethylene copolymer (A), and
   a polymer (B) which is an alpha-olefin copolymer comprising:
   alpha-olefin monomer units (Q) selected from one of $C_3$ to $C_{10}$ alpha-olefins; and
   monomer units (R) selected from one or more alpha-olefin(s) different from (Q), wherein one of the monomer units (R) is 1-butene.

3. The semiconductive polymer composition according to claim 1, wherein the ethylene copolymer (A) has a crystallization temperature of not more than 70° C.

4. The semiconductive polymer composition according to claim 1, wherein the ethylene copolymer (A) is present in the composition in an amount of 20 wt % or more and 65 wt. % or less, based on the total weight of the semiconductive polymer composition.

5. The semiconductive polymer composition according to claim 1, wherein the ethylene copolymer (A) has a content of methyl (meth)acrylate comonomer units of 5 wt. % or more, based on the total weight of the ethylene copolymer (A).

6. The semiconductive polymer composition according to claim 1, wherein the ethylene copolymer (A) has a content of methyl(meth)acrylate comonomer units of 20 wt. % or more, based on the total weight of the ethylene copolymer (A).

7. The semiconductive polymer composition according to claim 1, further comprising a cross-linking agent.

8. A power cable comprising a conductor, an insulation layer and at least one semiconductive layer comprising a semiconductive polymer composition as defined in claim 1.

9. The power cable according to claim 8, wherein the insulating layer comprises an ethylene homo- or copolymer.

10. A method for the preparation of a semiconductive layer of a power cable, wherein at least one semiconductive layer of said power cable is formed by the semiconductive polymer composition according to claim 1.

11. The method according to claim 10, wherein the semiconductive layer is strippable.

* * * * *